(12) United States Patent
Weir

(10) Patent No.: US 6,561,579 B1
(45) Date of Patent: May 13, 2003

(54) SADDLE SUPPORT HAVING A SOLID SECURING STRUCTURE

(75) Inventor: Steven Andrew Weir, Paignton (GB)

(73) Assignee: Muchachos International Co., Ltd., Taichung (TW)

( * ) Notice: Subject to any disclaimer, the term of this patent is extended or adjusted under 35 U.S.C. 154(b) by 0 days.

(21) Appl. No.: 10/081,405

(22) Filed: Feb. 25, 2002

(51) Int. Cl.⁷ .................................................. B60N 2/38
(52) U.S. Cl. .............................. 297/195.1; 297/215.15; 403/389
(58) Field of Search ........................ 297/195.1, 215.13, 297/215.15; 403/390, 87, 97, 389, 388, 84

(56) References Cited

U.S. PATENT DOCUMENTS

| | | | |
|---|---|---|---|
| 4,783,119 A | 11/1988 | Moses | 297/195 |
| 4,987,764 A | 1/1991 | Chen | 72/367 |
| 5,020,851 A | 6/1991 | Chen | 297/195 |
| 5,244,301 A | 9/1993 | Kurke et al. | 403/390 |
| 5,330,283 A | * 7/1994 | Ballard | |
| 5,722,718 A | * 3/1998 | Still et al. | |
| 5,749,622 A | * 5/1998 | Tseng | |
| 5,823,618 A | * 10/1998 | Fox et al. | |
| 5,979,978 A | * 11/1999 | Olsen et al. | |

* cited by examiner

Primary Examiner—Laurie K. Cranmer
(74) Attorney, Agent, or Firm—Charles E. Baxley

(57) ABSTRACT

A saddle support device includes a barrel disposed on a seat post and having a number of teeth extended inward of a bore of the barrel. Two blocks each has a number of teeth formed on one end for engaging into the bore of the barrel and for engaging with the teeth of the barrel, and for securing the blocks to the barrel at any selected angular position. A saddle device includes two support rods engaged into the blocks and secured to the barrel with the blocks. The engagement of the teeth of the blocks and the barrel may prevent the blocks from rotating relative to the barrel.

9 Claims, 5 Drawing Sheets

SADDLE SUPPORT HAVING A SOLID SECURING STRUCTURE

BACKGROUND OF THE INVENTION

1. Field of the Invention

The present invention relates to a saddle support device, and more particularly to a saddle support device having a solid securing structure.

2. Description of the Prior Art

Various kinds of typical saddle support devices have been developed for securing the cycle seats or the saddle devices onto the seat posts. U.S. Pat. No. 4,783,119 to Moses. U.S. Pat. No. 4,987,764 to Chen, U.S. Pat. No. 5,020,851 to Chen, and U.S. Pat. No. 5,244,301 to Kurke et al., disclose four of the typical saddle support devices each having a saddle device secured onto the seat post with one or more clamping members. The clamping members include a curved portion having a number of teeth formed thereon for engaging with a toothed or serrated curved portion of the seat post, and for securing the saddle device to the seat post at the required angular positions. However, the clamping members include only a relatively smaller portions or areas having the teeth for engaging with the serrated surface or the teeth of the seat post, such that the teeth of both the clamping members and of the seat post may be easily worn out or damaged after use, and such that the saddle device may not be solidly secured to the seat post at the required angular positions after use. When the fasteners for securing the saddle device or the clamping members to the seat post have become loose, the clamping members may thus be easily rotated relative to the seat post, such that the teeth of both the clamping members and of the seat post may further be easily worn out or damaged.

The present invention has arisen to mitigate and/or obviate the afore-described disadvantages of the conventional saddle support devices.

SUMMARY OF THE INVENTION

The primary objective of the present invention is to provide a saddle support device including a solid securing structure for solidly securing the saddle device to the seat post.

In accordance with one aspect of the invention, there is provided a saddle support device comprising a seat post including a barrel provided on top thereof, the barrel including a bore formed therein, and including two ends, and including a plurality of teeth extended inward of the bore thereof, two blocks each including a first end for engaging into the bore of the barrel and having an outer peripheral portion, and each including a plurality of teeth formed on the outer peripheral portion of the first end of the blocks for engaging with the teeth of the barrel, and for securing the blocks to the barrel at any selected angular position, and a saddle device including two support rods engaged into the blocks respectively and secured to the barrel with the blocks.

The blocks each includes a channel formed therein for receiving the support rods of the saddle device respectively. The channels of the blocks are formed in the first end of the blocks respectively for forming a pair of legs in the first end of each of the blocks.

Two gaskets may further be provided and engaged between the barrel and the blocks respectively.

A securing device may further be provided for securing the blocks to the barrel and includes one or more fasteners engaged through the blocks for forcing the blocks toward each other and for securing the blocks onto the barrel. The engagement of the teeth of the blocks with that of the barrel may prevent the blocks from rotating relative to the barrel even when the fasteners have become loose.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
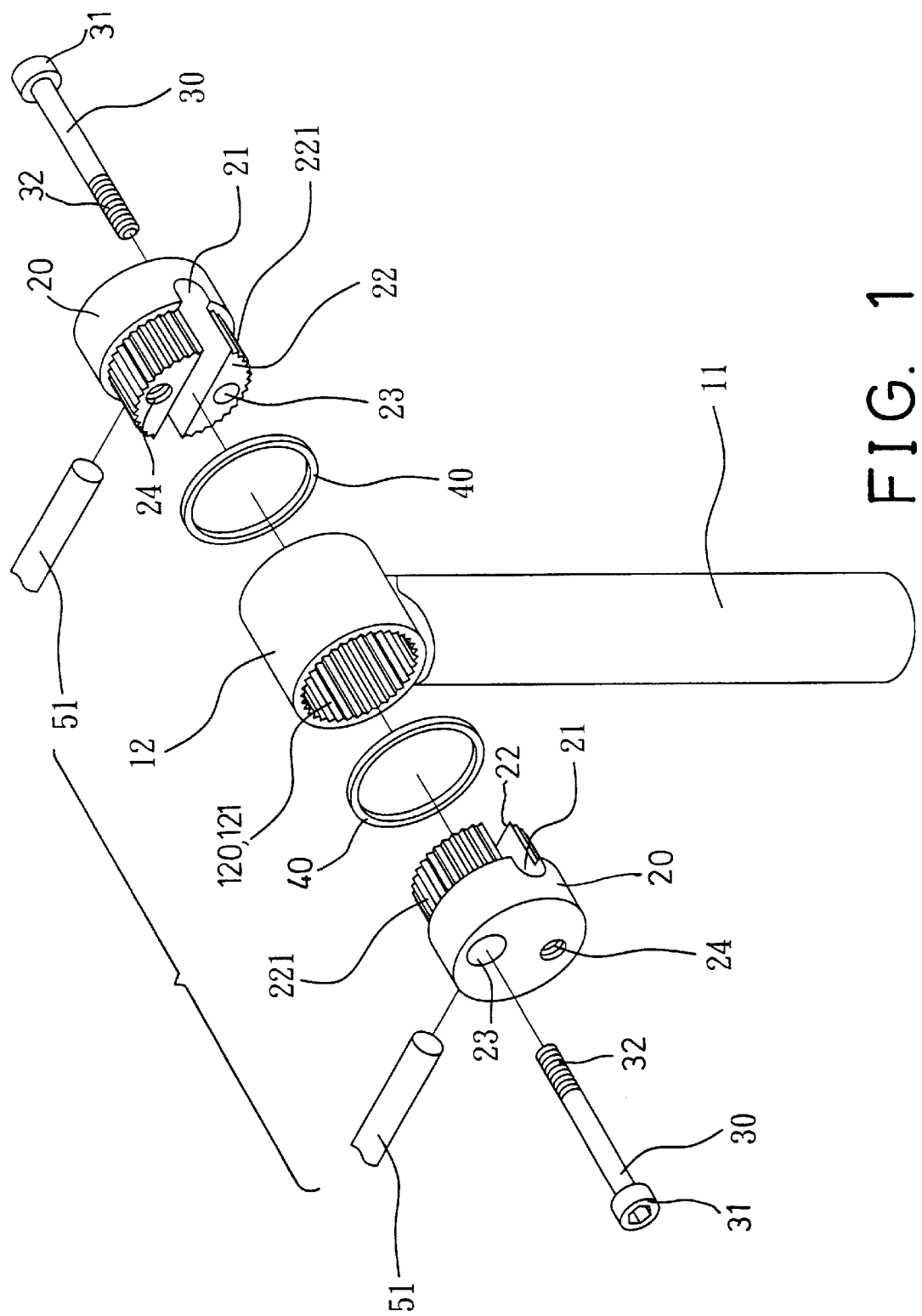
FIG. 1 is a partial exploded view of a saddle support device in accordance with the present invention.
Figure 2:
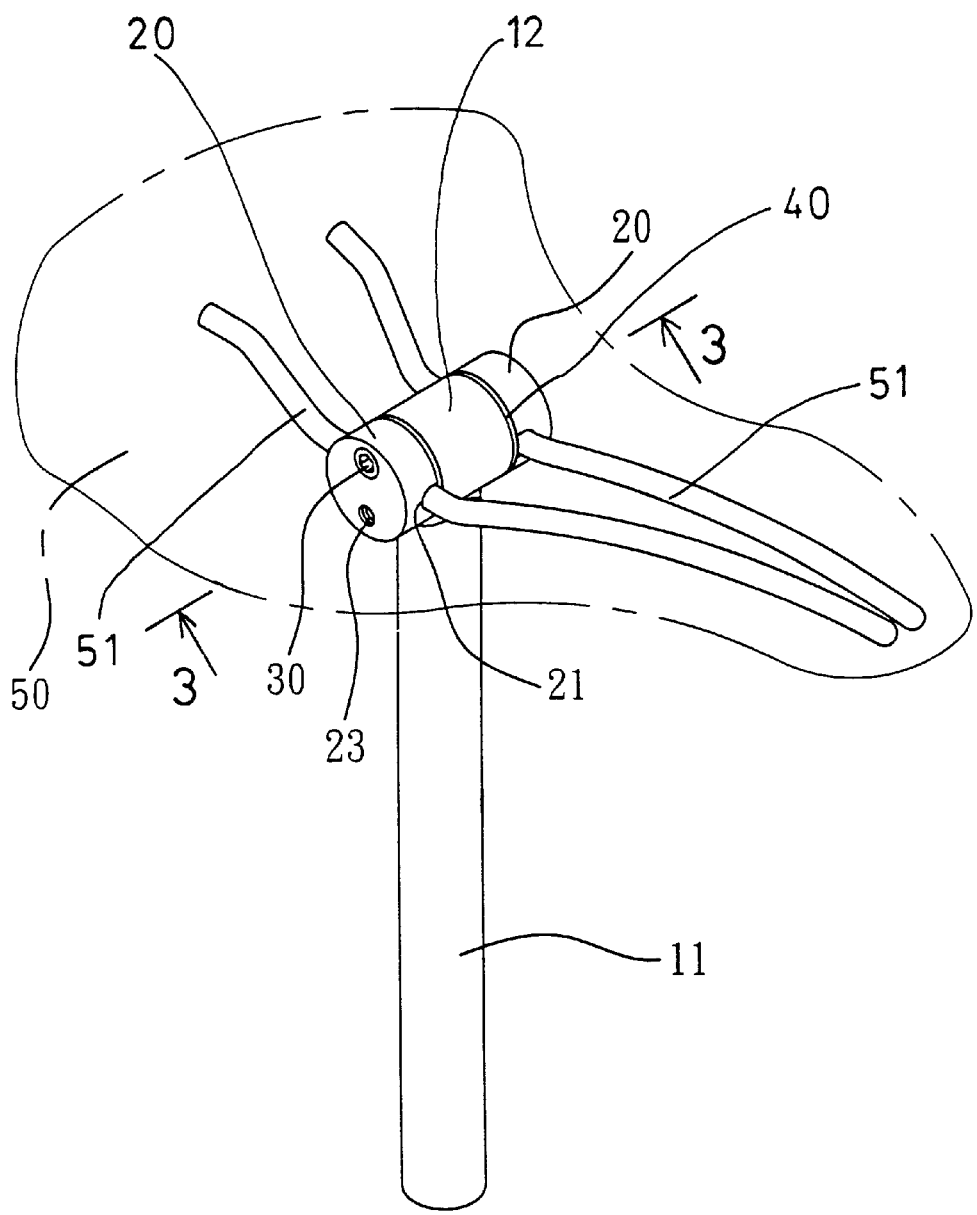
FIG. 2 is a perspective view of the saddle support device.
Figure 3:
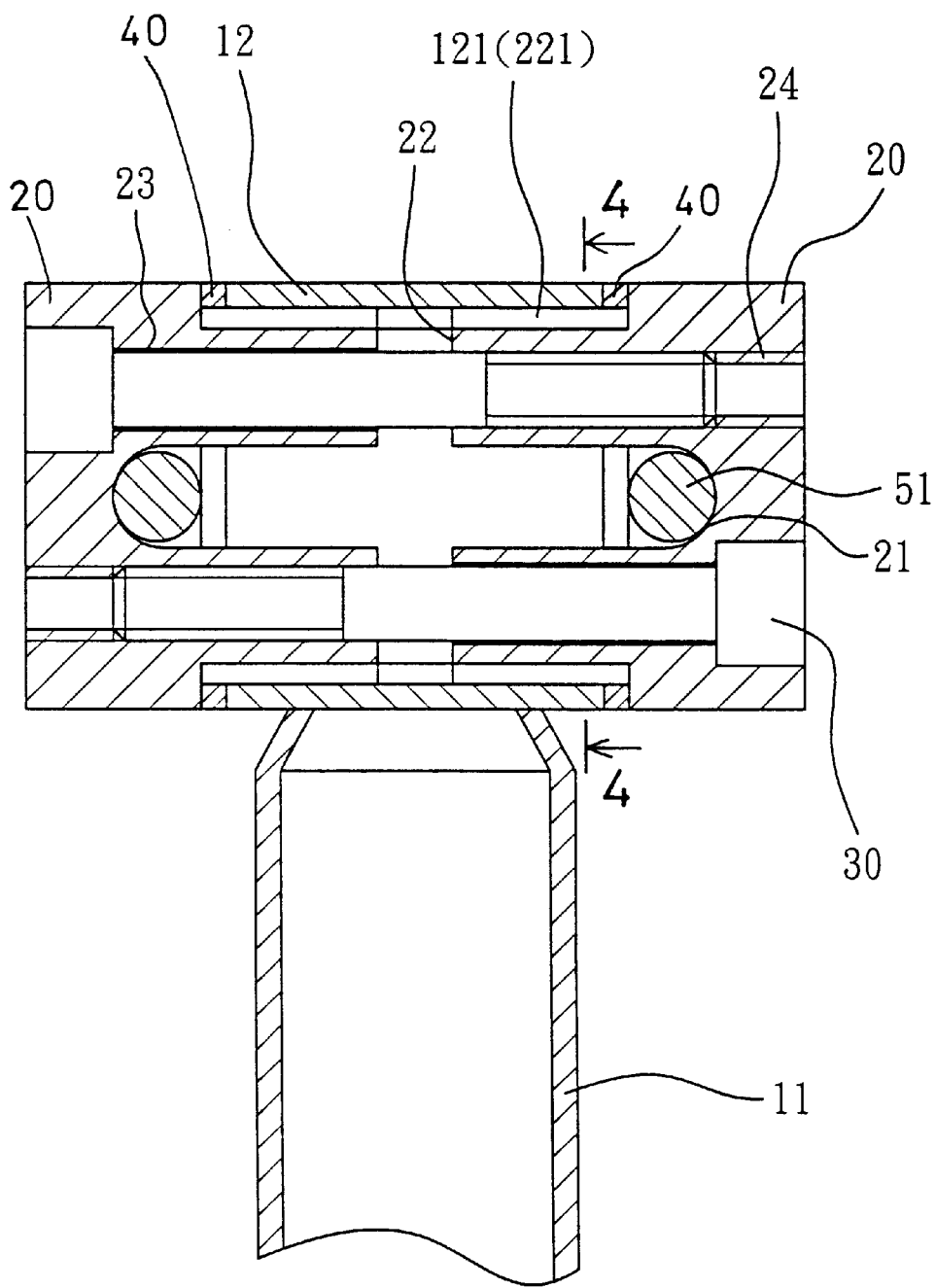
FIG. 3 is a cross sectional view taken along lines 3—3 of FIG. 2.

Referring to the drawings, and initially to FIGS. 1–4, a saddle support device in accordance with the present invention comprises a seat post 11, and a barrel 12 secured on top of the seat post 11 and substantially perpendicular to the seat post 11. The barrel 12 includes a bore 120 formed therein and includes a number of teeth 121 formed or provided or extended inward of the bore 120 thereof. The teeth 121 are preferably parallel to the barrel 12 and perpendicular to the seat post 11. The bicycle seat or the saddle device 50 (FIG. 1) is normally equipped with two parallel support wires or rods 51.

One or more, such as two blocks 20 each includes a channel 21 formed therein for receiving the support rods 51 of the saddle device 50, and for forming or defining a pair of semi-circular legs 22 in one end of the blocks 20 respectively. The legs 22 that are formed or provided on one end of the blocks 20 may be engaged into the ends of the barrel 12, and each includes a number of teeth 221 formed on the outer peripheral portion thereof for engaging with the teeth 121 of the barrel 12, and for securing the legs 22 and thus the blocks 20 and the support rods 51 to the barrel 12 at the required angular positions.

Two gaskets 40 may further be provided and engaged between the blocks 20 and the ends of the barrel 12 respectively. The blocks 20 each includes a stepped hole 23 and a screw hole 24 formed therein. One or more fasteners 30 include an enlarged head 31 engaged in the stepped holes 23 of the blocks 20 respectively, and include a threaded portion 32 for threading with the screw holes 24 of the other blocks 20, best shown in FIG. 3, and for securing the blocks 20 to the barrel 12, and for forcing the blocks 20 toward each other, and thus for securing the support rods 51 of the saddle device 50 to the blocks 20 and thus to the barrel 12 at the required or selected angular position.

Figure 4:
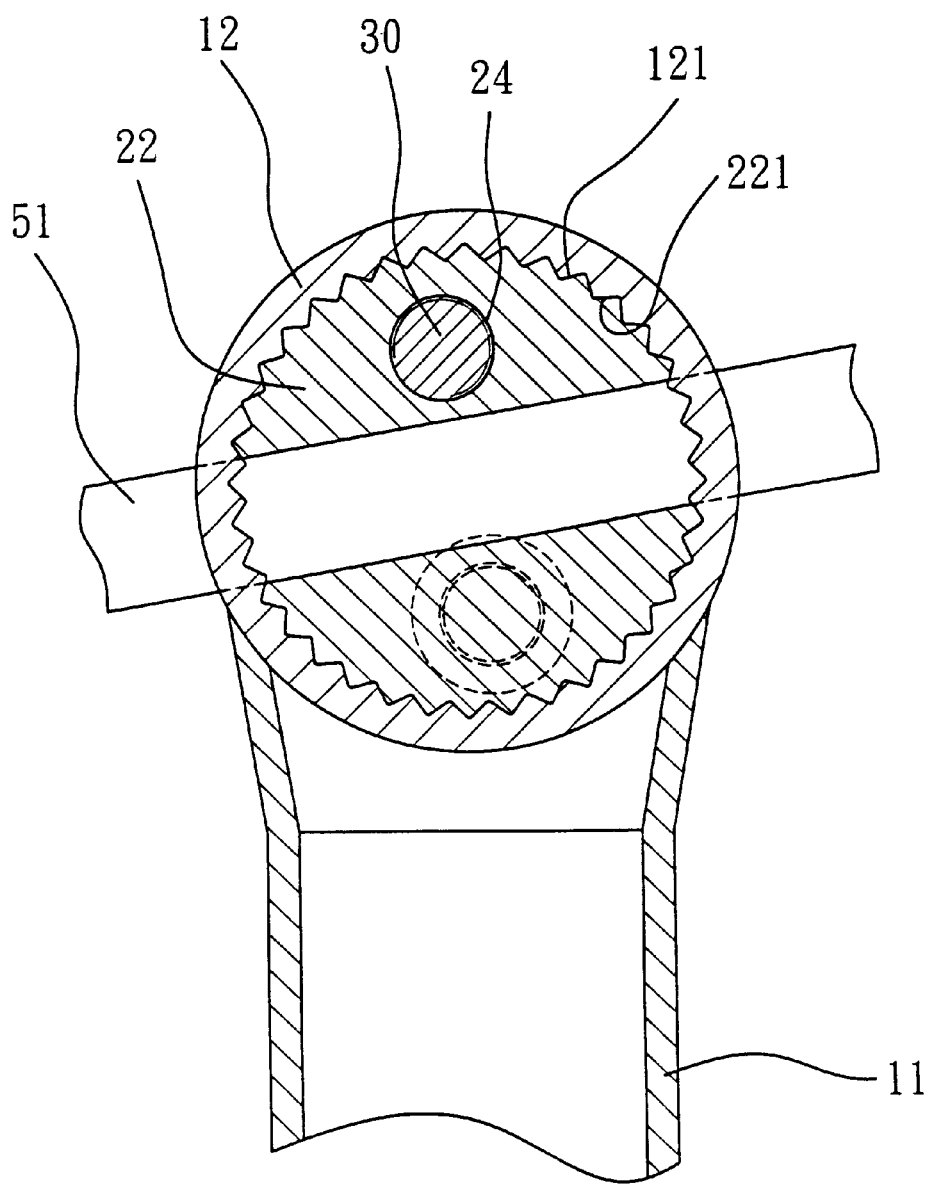
FIG. 4 is a partial cross sectional view taken along lines 4—4 of FIG. 3.
Figure 5:
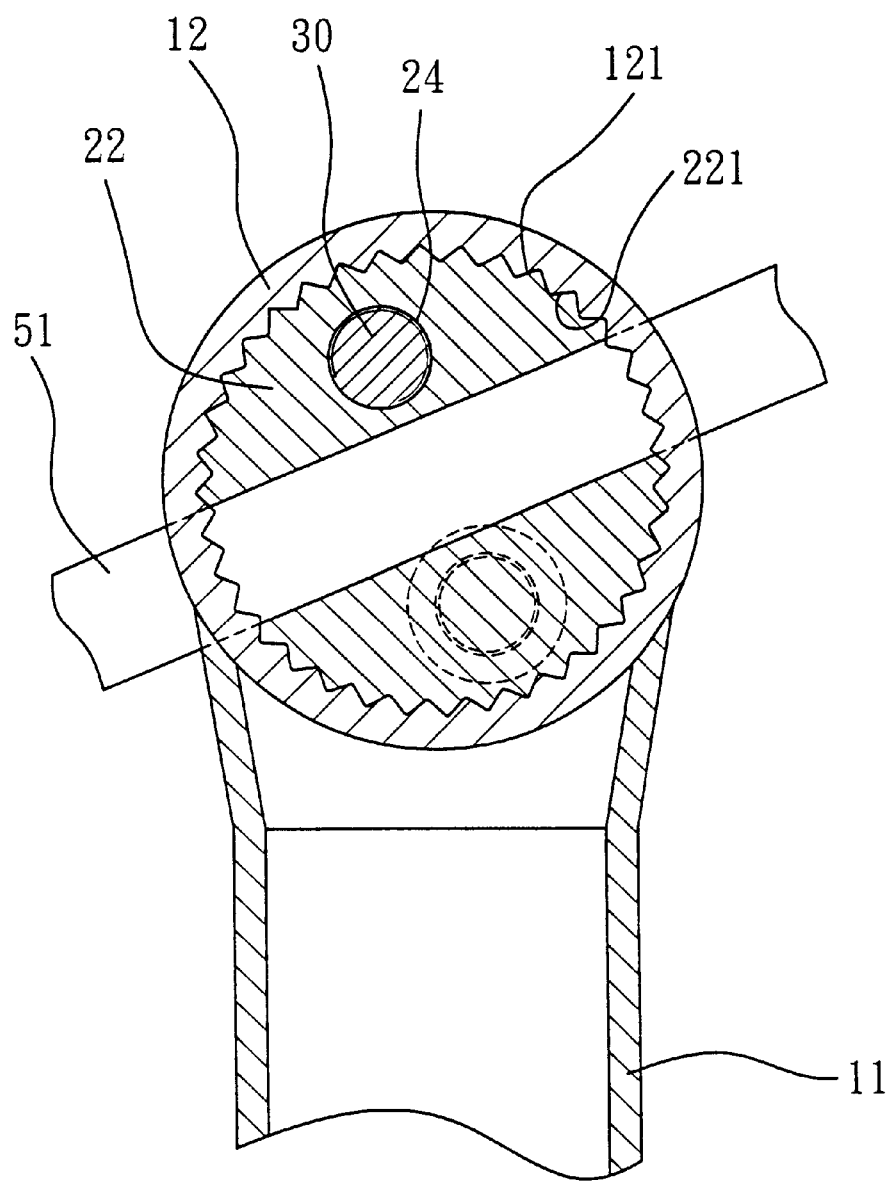
FIG. 5 is a partial cross sectional view similar to FIG. 4, illustrating the operation of the saddle support device.

In operation, as shown in FIGS. 4 and 5, the legs 22 of the blocks 20 may be rotated and adjusted relative to the barrel 12 to the required angular position before the legs 22 of the blocks 20 are engaged into the barrel 12, such that the support rods 51 of the saddle device 50 may also be rotated and adjusted and secured to the barrel 12, with the blocks 20, at the required or selected angular position. The fasteners 30 may further solidly securing the blocks 20 toward each other and/or to the barrel 12.

It is to be noted that the teeth 221 of the legs 22 of the blocks 20 may be solidly engaged with the teeth 121 of the barrel 12, for preventing the blocks 20 from rotating relative to the barrel 12, even when the fasteners 30 have become loose or even when the fasteners 30 are not solidly secured to the blocks 20. The legs 22 of the blocks 20 may be rotated relative to the barrel 12 only after the legs 22 of the blocks 20 are disengaged from the barrel 12.

Accordingly, the saddle support device in accordance with the present invention includes a solid securing structure for solidly securing the saddle device to the seat post.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A saddle support device comprising:
    a seat post including a barrel provided on top thereof, said barrel including a bore formed therein, and including a plurality of teeth extended inward of said bore thereof,
    at least one block including a first end for engaging into said bore of said barrel and having an outer peripheral portion, and including a plurality of teeth formed on said outer peripheral portion of said first end of said at least one block for engaging with said teeth of said barrel, and for securing said at least one block to said barrel at any selected angular position, and
    a saddle device including at least one support rod engaged into said at least one block and secured to said barrel with said at least one block, and
    said at least one block including a channel formed therein for receiving said at least one support rod of said saddle device, and said channel of said at least one block is formed in said first end of said at least one block for forming a pair of legs in said first end of said at least one block.

2. The saddle support device according to claim 1 further comprising a gasket engaged between said barrel and said at least one block.

3. The saddle support device according to claim 1 further comprising means for securing said at least one block to said barrel.

4. A saddle support device comprising:
    a seat post including a barrel provided on top thereof, said barrel including a bore formed therein, and including two ends, and including a plurality of teeth extended inward of said bore thereof,
    two blocks each including a first end for engaging into said bore of said barrel and having an outer peripheral portion, and each including a plurality of teeth formed on said outer peripheral portion of said first end of said blocks for engaging with said teeth of said barrel, and for securing said blocks to said barrel at any selected angular position, and
    a saddle device including two support rods engaged into said blocks respectively and secured to said barrel with said blocks.

5. The saddle support device according to claim 4, wherein said blocks each includes a channel formed therein for receiving said support rods of said saddle device respectively.

6. The saddle support device according to claim 5, wherein said channels of said blocks are formed in said first end of said blocks respectively for forming a pair of legs in said first end of each of said blocks.

7. The saddle support device according to claim 4 further comprising two gaskets engaged between said barrel and said blocks respectively.

8. The saddle support device according to claim 4 further comprising means for securing said blocks to said barrel.

9. The saddle support device according to claim 8, wherein said securing means includes at least one fastener engaged through said blocks for forcing said blocks toward each other and for securing said blocks onto said barrel.

* * * * *